Feb. 17, 1959  J. F. SAUER  2,873,955
BITUMINOUS BATCH PLANT AND ACTUATING SYSTEM THEREFOR
Filed Jan. 11, 1956  3 Sheets-Sheet 1
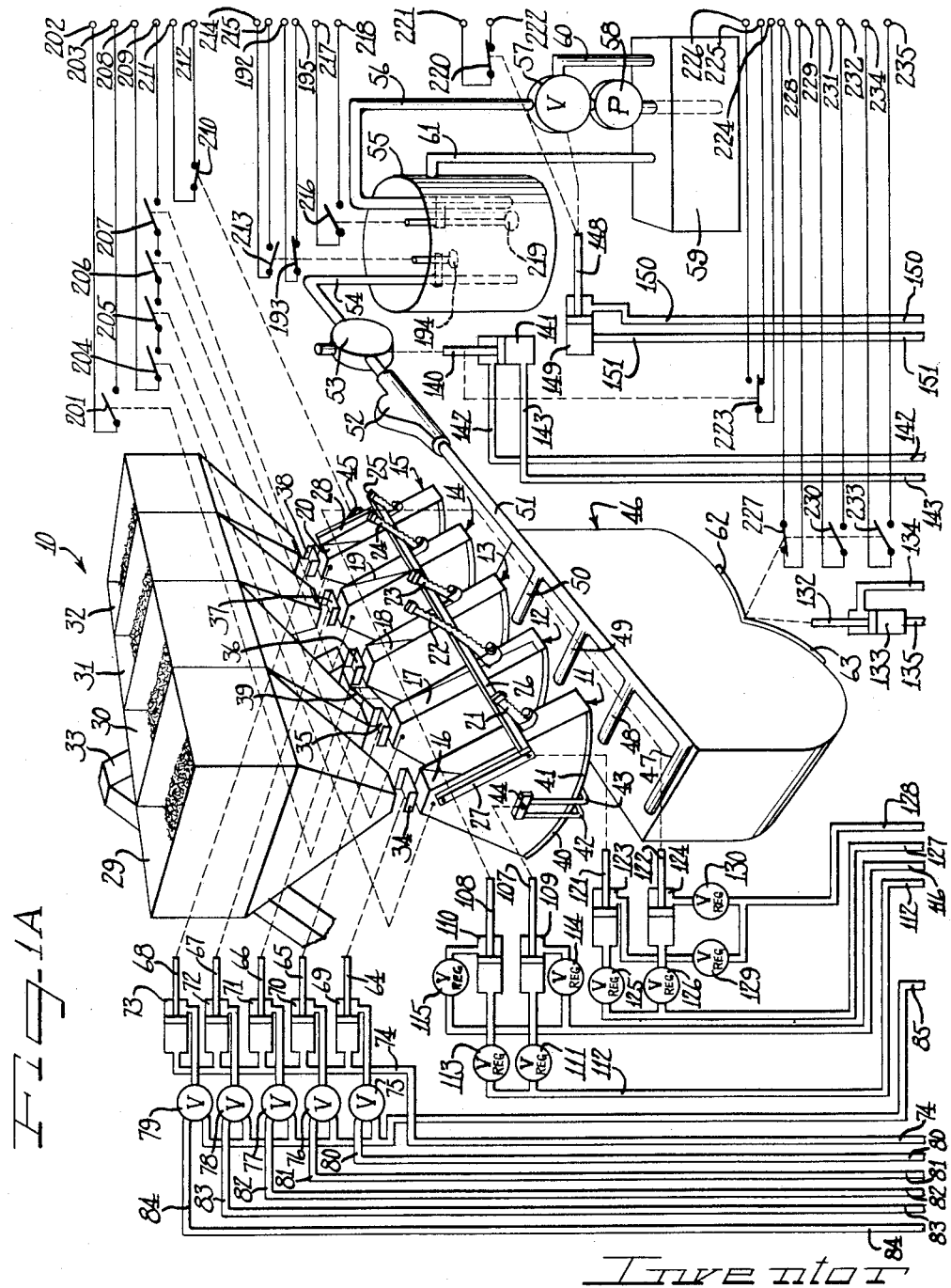
Inventor
James F. Sauer

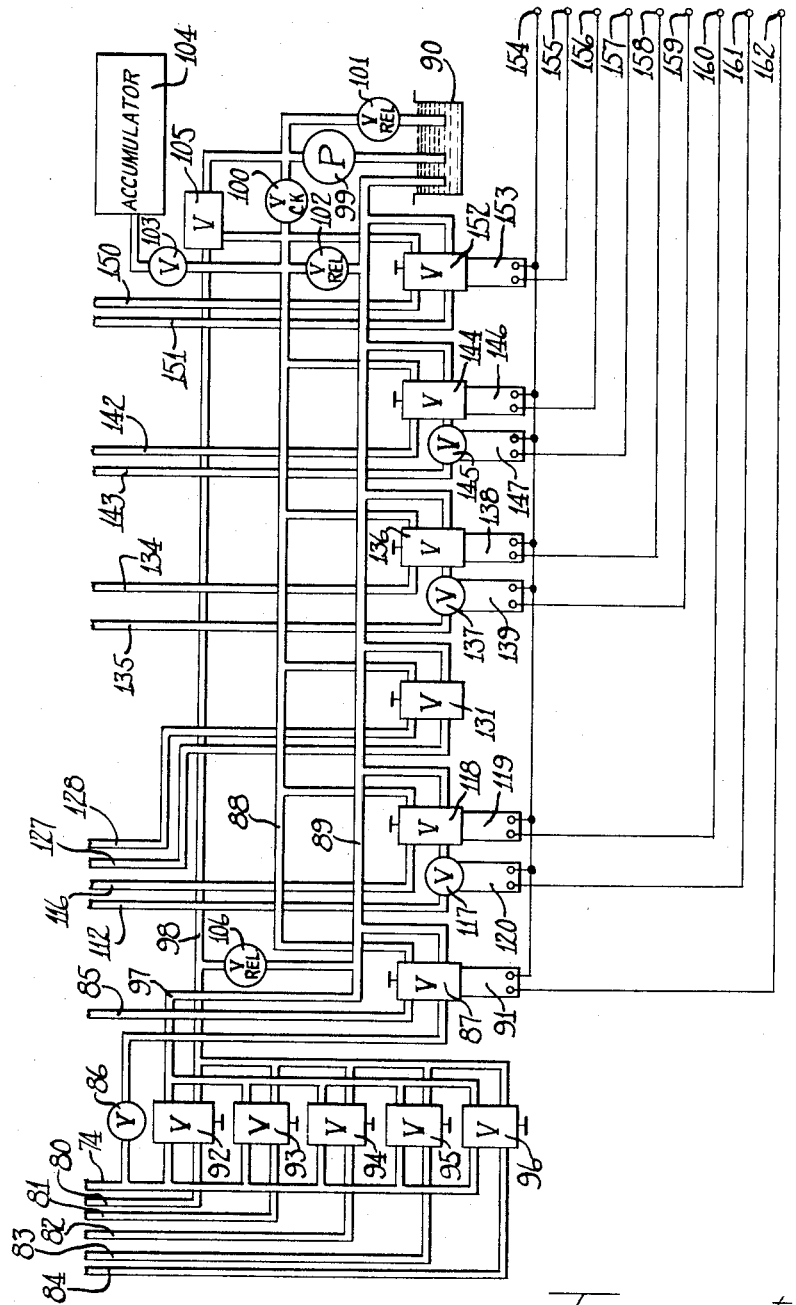

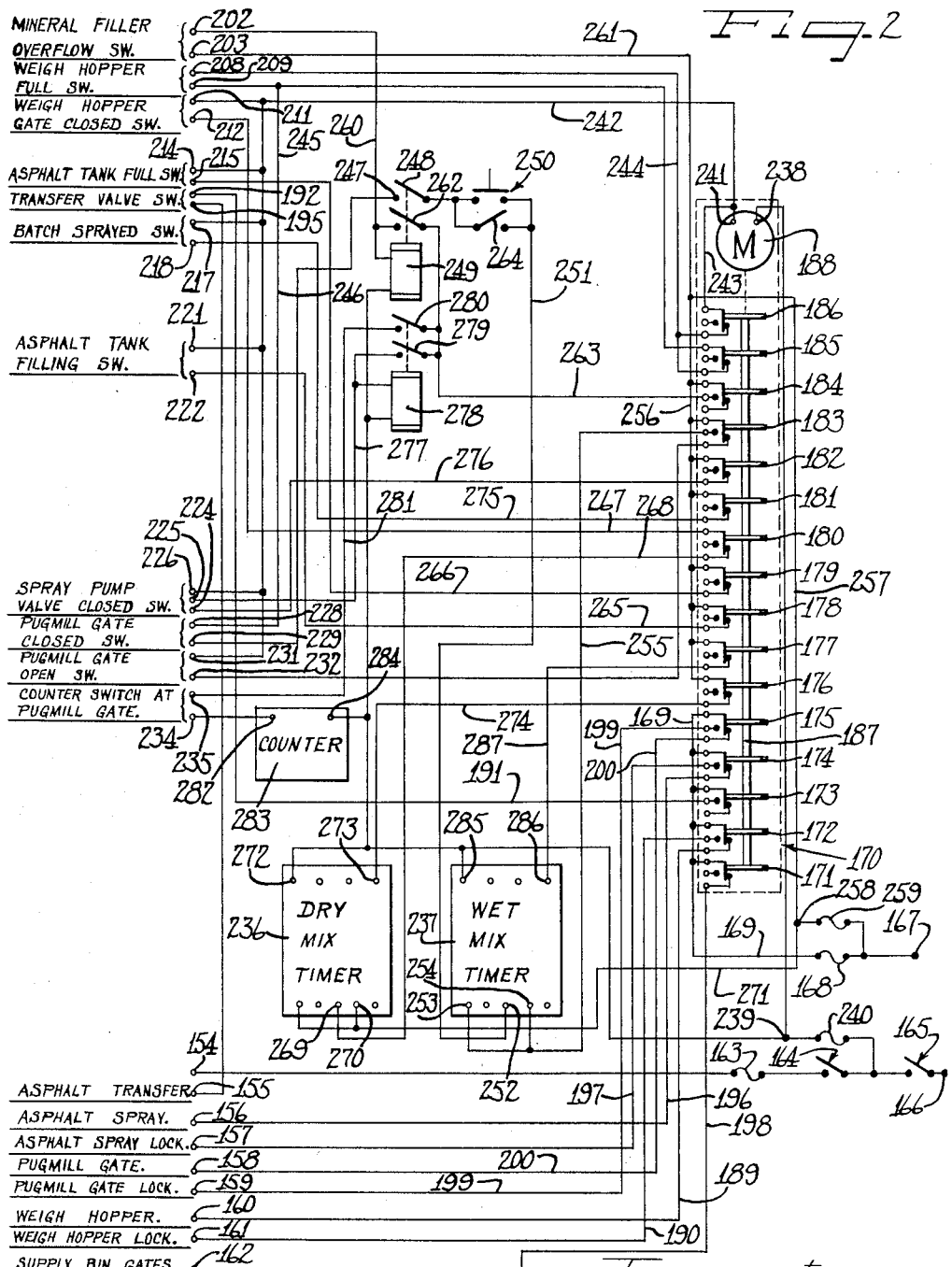

United States Patent Office 2,873,955
Patented Feb. 17, 1959

2,873,955

BITUMINOUS BATCH PLANT AND ACTUATING SYSTEM THEREFOR

James F. Sauer, Aurora, Ill., assignor to Barber-Greene Company, Aurora, Ill., a corporation of Illinois Application January 11, 1956, Serial No. 558,434

15 Claims. (Cl. 259—154)

This invention relates to a bituminous batch plant in which a batch of paving material or the like is produced by mixing selected quantities of aggregate of various sizes with asphalt.

In batch plants heretofore used, a supply bin gate is opened to allow one size of aggregate to flow into a weight hopper and the gate must be closed at the precise instant to shut off the flow of material as the correct weight is recorded by the weight hopper scale. Such a system requires very skillful control because the operator must develop the technique of closing the gate as the correct weight is approached so that the column of aggregate falling as the gate is closed will bring the total amount to the desired weight. If one size of aggregate is overweighed one of the following sizes must be underweight in order to give a desired total weight and vice versa. Thus, correct proportioning is a problem. Furthermore, the weighing of the various sizes of aggregates takes considerable time.

It has been proposed to use electronic devices to measure out the aggregates but with such systems, the desired weight must be anticipated electrically which necessitates delicate controls apt to get out of adjustment and fail in operation.

It is therefore an object of this invention to provide an improved bituminous batch plant in which the aggregate materials are rapidly and accurately measured.

Another object of this invention is to provide a batch plant incorporating an actuating system by which it can be readily operated either manually or automatically.

According to this invention, a batch plant is provided in which the weigh hopper is split into a plurality of compartments, one for each size of aggregate, and the volume of each compartment is adjusted so that only the desired amount of material will fit into it. With this arrangement, the need for a careful operator, or for delicate electrical controls, is eliminated and a much faster operation is possible.

After the weigh hopper compartments are filled, a gate at the bottom of the weigh hopper is opened to simultaneously release the aggregate from all compartments to fall directly into a pug mill. The aggregate is then mixed dry for a length of time after which liquid asphalt is sprayed into the pug mill and after a certain length of wet mixing, a gate at the bottom of the pug mill is opened to allow the batch to fall into a truck or other receptacle.

It will be appreciated that with this system, a batch of paving material is produced with maximum speed and with extremely accurate proportioning of the materials. The system requires a minimum degree of skill for manual operation and is particularly adapted for automatic operation.

Important features of the invention reside in an actuating system by which the plant can be readily set up for operation and readily operated after being set up. The system can be operated either manually or automatically and is very flexible to allow part manual and part automatic operation when desired. At the same time, the system is arranged in a manner to minimize the possibility of improper manual operation and to prevent further operation in the event of failure of one or more of the component elements. For example, if there is an insufficient quantity of asphalt or of an aggregate of any size, further operation of the system is prevented until the situation is remedied.

This invention contemplates other and more specific objects, features and advantages which will become more fully apparent from the following detailed description taken in conjunction with the accompanying drawings which illustrate a preferred embodiment and in which:

Figures 1A and 1B together form a perspective diagrammatic view of a batch plant constructed in accordance with the principles of this invention with a hydraulic actuating system being diagrammatically illustrated, as well as certain electrical components; and Figure 2 is a schematic diagram of an electrical system used for controlling the operation of the batch plant of Figures 1A and 1B.

Reference numeral 10 generally designates a bituminous batch plant constructed according to the principles of this invention. The batch plant 10 comprises a weigh hopper divided into a plurality of separate compartments 11, 12, 13, 14 and 15 which respectively have walls 16, 17, 18, 19 and 20, the walls 16–20 being adjustable to vary the volumes of the respective compartments. For this purpose, arms 21, 22, 23, 24 and 25 are respectively secured to the walls 16, 17, 18, 19 and 20, and the arms 21–25 have toothed edges meshed with worms carried by a bar 26 with the adjustment being effected by the rotation of the worms. The volumes of all of the compartments may be simultaneously increased or decreased by moving the bar 26 which is supported at its opposite ends on arms 27 and 28.

The compartments 11, 12, 14 and 15 are respectively arranged to receive aggregate of various sizes from storage bins 29, 30, 31 and 32, and the center compartment 13 is arranged to receive mineral fines from the lower end of a chute 33. Gates 34, 35, 36, 37 and 38 are disposed above the compartments 11, 12, 13, 14 and 15 to cut off the supply of aggregate thereto. The gates 34, 35, 37 and 38 are preferably arranged to prevent flow of aggregate from the bins 29, 30, 31 and 32, but the gate 36 may allow continued flow of mineral fines into a discharge chute 39, and the supply of mineral fines to the supply chute 33 may be continuous.

A pair of pivotal gates 40 and 41 form the bottom of the weigh hopper compartment 11 and the other compartments are provided with similar pairs of gates. A pair of rods 42 and 43 extend under all of the gates and are linked at their opposite ends to coupling members 44 and 45. After the weigh hopper compartments are full, the gates 34–38 are closed to prevent further flow of aggregate into the weigh compartments, and the coupling members 44 and 45 are then lowered to simultaneously discharge the aggregate from all of the compartments into a pug mill 46.

The aggregate may be mixed dry in the pug mill 46 for a certain length of time after which liquid asphalt is sprayed into the pug mill 46. For this purpose, a plurality of spray nozzles 47, 48, 49 and 50 are coupled to a common header 51 which is coupled to the outlet of a spray pump 52 the inlet of which is coupled through a valve 53 to a suction pipe 54 extending into a measuring tank 55.

Asphalt is supplied to the measuring tank 55 through a supply pipe 56 connected through a valve 57 to the outlet of a pump 58 having its inlet communicating with a supply tank 59. When the valve 57 is closed, the outlet of the pump 58 communicates with a pipe 60 communicating with the tank 59, so as to recirculate the liquid. When the liquid reaches a certain level in the measuring tank 55, it overflows through a pipe 61 into the supply tank 59.

A suitable scale (not shown) is preferably connected to the weigh hopper, to permit adjustment of the volumes of the compartments 11–15. For example, to obtain the proper amount of aggregate from the bin 29, the gate 34 is opened, with the gates 35–38 closed, until the proper weight of the aggregate of that grade is recorded on the scale, and the wall 16 may be adjusted so that such weight will completely fill the compartment 11. Each of the other compartments may be adjusted in a similar fashion.

The measuring tank 55 is also preferably connected to a measuring scale (not shown) and the suction pipe 54 may be adjusted vertically to obtain the proper weight of asphalt for supply to the pug mill 46.

It will be appreciated that the plant 10 can be readily set up for operation and once it is set up, the aggregate and asphalt in correct proportions can be readily mixed in a rapid cycle of operation.

It should be noted that after the aggregate and asphalt are thoroughly mixed in the pug mill 46, a pair of integrally connected sections 62 and 63 forming a portion at the bottom of the pug mill 46 may be slidably moved outwardly to allow the mixed material to drop into a truck or other receptacle.

A hydraulic system is provided for actuating the supply bin gates, the weigh hopper gates, the spray valve, the asphalt supply valve and the pug mill gates, the system being operable either manually or automatically.

In particular, the gates 34, 35, 36, 37 and 38 are respectively connected to pistons 64, 65, 66, 67 and 68, as indicated diagrammatically by dotted lines in Figure 1, the pistons 64–68 being movable in hydraulic cylinders 69–73. One end of each of the cylinders 69–73 is connected to a conduit 74 and the other ends of the cylinders 69–73 are respectively connected to manually operable selector valves 75–79. The selector valves 75–79 are arranged to connect the cylinders 69–73 either to conduits 80–84 or to a common conduit 85. The common conduit 85 is used when it is desired to actuate all of the gates 34–38 simultaneously, while the individual conduits 80–84 are used when it is desired to actuate the gates independently.

To actuate the gates 34–38 simultaneously, the selector valves 75–79 are positioned to connect the cylinders 69–73 to the common conduit 85 and fluid under pressure is supplied to the conduit 85 with the conduit 74 being connected to a fluid reservoir. In particular, the conduit 74 is connected through a normally open valve 86 to a control valve 87 and the conduit 85 is connected directly to the control valve 87, the control valve 87 being also connected to a header 88 to which fluid under pressure is supplied and a return line 89 which communicates with a reservoir 90. The control valve 87 may be actuated either manually or electrically by a solenoid 91 to connect the header 88 to the conduit 85 and the return line 89 to the conduit 74 through the valve 86.

For individual actuation of one or more of the gates 34–38, one or more of the sector valves 75–79 corresponding to the gate or gates to be actuated are positioned to couple the cylinder or cylinders corresponding to the gates to be actuated to one or more of the conduits 80–84. The valve 86 is then closed and one or more of a plurality of control valves 92–96 are actuated.

The control valves 92–96 are respectively connected to the conduits 80–84 and are all connected to the conduit 74. The control valves 92–96 are also connected through a conduit 97 to the return line 89, and to a line 98 to which fluid under pressure is supplied in a manner as will be described. Upon actuation of any one of the control valves 92–96, the conduit 74 is connected to the return line 89, and the corresponding one of the conduits 80–84 is connected to the line 98.

It will thus be appreciated that the gates 34–38 may be actuated either simultaneously or individually as desired. In setting up the plant 10 for operation, it is, of course, desirable to be able to actuate the gates 34–38 individually but after the plant is set up for operation, the gates 34–38 are then actuated simultaneously.

To supply fluid under pressure to the header 88, a pump 99 is provided having an inlet connected to the reservoir 90 and an outlet connected through a check valve 100 to the header 88. The outlet of the pump 99 may also be connected through a relief valve 101 to the reservoir 90, and another relief valve 102 is connected between the header 88 and the return line 89. To maintain pressure in the header 88, it is connected through a shut-off valve 103 to an accumulator 104.

For supplying fluid under pressure to the conduit 89, it is connected to an unloading valve 105 which is connected to the header 88 and also to the outlet of the pump 99. A relief valve 106 is connected between the conduit 98 and the return line 89.

For actuation of the weigh hopper gates, the coupling members 44 and 45 are respectively connected to pistons 107 and 108, as indicated diagrammatically by dotted lines, the pistons 107 and 108 being movable in hydraulic cylinders 109 and 110. One end of the cylinder 109 is connected through the regulating valve 111 to a conduit 112 and one end of the cylinder 110 is similarly connected through a regulating valve 113 to the conduit 112. The other ends of the cylinders 109 and 110 are respectively connected through regulating valves 114 and 115 to a conduit 116. The conduit 112 is connected through a valve 117 to a control valve 118 and the conduit 116 is directly connected to the control valve 118, the control valve 118 being also connected to the header 88 and the return line 89.

To actuate the weigh hopper gates, the valve 117 is opened and the control valve 118 is actuated to connect the conduit 112 to the return line 89 and the conduit 116 to the header 88. The regulating valves 111, 113, 114 and 115 are preferably of a constant flow type so as to obtain smooth actuation of the gates. The gates may, of course, be actuated in the reverse direction by actuating the control valve 118 to reverse the connections of the conduits 112 and 116 to the header 88 and return line 89.

The control valve 118 is arranged to be actuated either electrically by a solenoid 119 or manually. However, the weigh hopper gates should only be opened during a certain period of the cycle of operation, and the purpose of the valve 117 is to prevent manual operation except during the proper time period, the valve 117 being controlled by a solenoid 120 from the electrical system in a manner as will be described.

The volume of the weigh hopper compartments is not ordinarily varied during operation. However, means are provided for simultaneously increasing or decreasing the volume of all of the compartments 11–15. In particular, the opposite ends of the bar 26 are connected to pistons 121 and 122, as diagrammatically indicated by dotted lines, the pistons 121 and 122 being movable in hydraulic cylinders 123 and 124. The left-hand ends of the cylinders 123 and 124 are connected through constant flow regulating valves 125 and 126 to a conduit 127 and the right-hand ends of the cylinders 123 and 124 are connected to a conduit 128 through a pair of constant flow regulating valves 129 and 130. The conduits 127 and 128 are connected directly to a manually operable control valve 131 which is also connected to the header 88 and the return line 89. By operation of the control valve 131, either one of the conduits 127 or 128 may be connected to the pressure header 88 with the other conduit being connected to the return line 89, so as to simultaneously increase or decrease the volume of all of the weigh hopper compartments 11–15.

For actuation of the pub mill gates 62 and 63, they are connected to a piston 132 movable in a hydraulic cylinder 173 the opposite ends of which are connected to conduits 134 and 135. The conduit 134 is connected directly to a control valve 136 and the conduit 135 is connected through a locking valve 137 to the control valve 136, the control valve 136 being connected to the pressure header 88 and the return line 89. The control valve 136 and the locking valve 137 may be operated by solenoids 138 and 139. The valves 136 and 137 operate in the same general manner as the valves 117 and 118 which control operation of the gates 11–15.

For operation of the spray valve 53, it is connected to a piston 140 movable in a hydraulic cylinder 141 which is connected to conduits 142 and 143, the conduit 142 being directly connected to a control valve 144 which is connected to the header 88 and the return line 89, and the conduit 143 being connected through a locking valve 145 to the control valve 144 with the control valve 144 and the locking valve 145 being operated by solenoids 146 and 147.

For operation of the asphalt supply valve 57, it is connected to a piston 148 movable in a hydraulic cylinder 149 which is connected through conduits 150 and 151 to a control valve 152 operable either manually or by a solenoid 153 and connected to the header 88 and the return line 89.

For operation of the system, a terminal 154 is connected to one terminal of each of the valve-operating solenoids, and terminals 155, 156, 157, 158, 159, 160, 161 and 162 are respectively connected to the other terminals of the solenoids 153, 146, 147, 138, 139, 119, 120 and 91. Referring to the electrical diagram of Figure 2, the common terminal 154 is connected through a fuse 163, an automatic-manual selector switch 164 and an on-off switch 165 to a terminal 166 arranged to be connected to one side of a suitable supply of electrical current. A terminal 167 is arranged to be connected to the other side of such source and is connected through a fuse 168 to a conductor 169 which is arranged to be connected to the terminals 155–162 in a certain sequence by a timer generally designated by reference numeral 170. The timer 170 comprises 16 cams 171–186 mounted on a shaft 187 which is driven by a motor 188 at a speed such that the shaft 187 will rotate through one revolution in 20 seconds.

When the timer cam shaft 187 rotates from an initial position, which may be referred to as the "0.0 second position," to a 0.5 second position, the second cam 172 operates a switch which simultaneously disconnects the conductor 169 from a conductor 189 and connects the conductor 169 to a conductor 190. The conductors 189 and 190 are respectively connected to the terminals 160 and 161 and the weigh hopper control valve solenoid 119 is deenergized while the weigh hopper gate locking valve solenoid 120 is energized. The valves are arranged in a manner such that energization of the locking valve solenoid 120 opens the valve 117 and deenergization of the solenoid 119 results in movement of the valve 118 to a position such that fluid flows to the cylinders 109 and 110 in a direction to open the weigh hopper gates.

When the timer cam shaft 187 reaches a 7.5 seconds position, the switch operated by the second cam 172 is returned to its initial position to cause the weigh hopper gates to be closed.

At a 8.5 seconds position of the timer cam shaft 187, the third cam 173 operates to disconnect the conductor 169 from a conductor 191, the switch having been operated at the 16 seconds position in the preceding cycle to connect the conductor 169 to the conductor 191. The conductor 191 is connected to a terminal 192 which as illustrated in Figure 1 is connected through a switch 193 operable by a float 194 in the measuring tank 55 to a terminal 195, the terminal 195 being connected to the terminal 155, as illustrated in Figure 2.

Accordingly, at the 8.5 seconds position of the cam shaft 187, the solenoid 153 will be deenergized, assuming that the switch 193 is closed, and the valve 57 will be operated to discontinue flow through the supply pipe 56 and cause recirculation from the pump 58 through the pipe 60. The switch 193 is opened when the float 194 is raised to a position such that the measuring tank 55 is full, and the switch 193 functions to discontinue the supply of asphalt to the tank 55 if the tank is full before the cam shaft reaches the 8.5 seconds position thereof.

At the 9.5 seconds position of the cam shaft 187, the fourth cam 174 operates to simultaneously disconnect the conductor 169 from a conductor 196 and connect the conductor 169 to a conductor 197, the conductors 196 and 197 being respectively connected to the terminals 156 and 157 and hence to the solenoids 146 and 147 which operate the asphalt spray control valve 144 and the locking valve 145. The operation is such that at the 9.5 seconds position of the cam shaft 187, the spray valve 53 is opened to cause the pump 52 to spray asphalt into the pug mill 46.

At a 10.5 seconds position of the timer cam shaft 187, the first cam 171 operates a switch which disconnects the conductor 169 from a conductor 198 connected to the terminal 162 which is connected to the solenoid 91 operating the control valve 87. The operation is such that the pistons 64–68 are simultaneously operated to open the supply bin gates 34–38, assuming of course that the valve 86 and the selector valves 75–79 are in their proper positions for automatic operation. Thus, at the 10.5 seconds position, the weigh hopper compartments 11–15 begin to fill in preparation for the next cycle.

At the 15 seconds position of the timer cam shaft 187, the fourth cam 174 operates a switch to disconnect the conductor 169 from the conductor 197 and reconnect the conductor 169 to the conductor 196, which results in closure of the spray pump valve 53 so that the spray pump 52 stops spraying asphalt and sucks air.

As previously indicated, at the 16 seconds position of the timer cam shaft, the third cam 173 operates to connect the conductor 169 to the conductor 191 which energizes the solenoid 153 and causes actuation of the valve 57 to a position in which asphalt is supplied from the tank 59 through the measuring tank 55.

At a 16.5 seconds position of the timer cam shaft 187, the first cam 171 operates to reconnect the conductor 169 to the conductor 198 which results in deenergization of the solenoid 91 and actuation of the supply bin gates 34–38 to their closed positions.

At a 19 seconds position of the timer cam shaft 187, the fifth cam 175 operates a switch to simultaneously connect the conductor 169 to a conductor 199 and disconnect the conductor 169 from a conductor 200. The conductors 199 and 200 are respectively connected to the terminals 159 and 158 and hence to the solenoids 139 and 138 which control the locking valve 137 and the control valve 136. The operation is such that deenergization of the solenoid 138 and energization of the solenoid 139 result in actuation of the pug mill gates 62 and 63 to open positions to allow the mixed batch of material to be discharged from the pug mill 46.

At the 20 seconds position (also the 0.0 second position) of the timer cam shaft 187, the fifth cam 175 disconnects the conductor 169 from the conductor 199 and reconnects the conductor 169 to the conductor 200 which results in closure of the pug mill gates 62 and 63, and the system is ready to repeat the cycle.

Important features of the invention reside in the provision of means for preventing and discontinuing operation of the timer motor 188 in a manner to insure proper operation of the system.

In particular, a switch 201 (Figure 1a) is connected to terminals 202 and 203 and is arranged to be operated by a flop gate in the mineral filler overflow chute 39 as diagrammatically illustrated. If this switch 201 has not been actuated by overflowing mineral filler during the time the supply bin gates were open (between the 10.5 and 16.5 seconds positions on the cycle timer), it will not allow the cycle timer to run at the very beginning of the cycle (0.0 to 0.5 second) and the weigh hopper cannot be discharged. This is to insure that weigh hopper loads without the proper amount of mineral filler will not be discharged to the pug mill.

Four switches 204, 205, 206 and 207 are connected in series between terminals 208 and 209 and are arranged to be closed when the weigh hopper bins 16, 17, 19 and 20 are full, as diagrammatically illustrated. If, because of a shortage of aggregate, one or more of the weigh hopper bins did not fill completely during the time the supply bin gates 34–38 were open, the corresponding one or ones of the switches 204–207 will not be closed and will prevent the cycle timer from operating at the beginning of the cycle (0.0 to 0.5 second on the cycle timer), thus preventing a light batch from being discharged from the weigh hopper to the pug mill.

A switch 210 is connected to terminals 211 and 212 and is mechanically connected through the weigh hopper gates as diagrammatically illustrated, to be closed with the weigh hopper gates in the closed position. This switch will stop the cycle timer (at the 9 seconds position) if for any reason the weigh hopper gates do not close completely.

A switch 213 is connected to terminals 214 and 215 and is mechanically connected to the float 194 to be closed when the weigh or measuring bucket or tank 55 is full and beginning to overflow. If the bucket does not fill completely, this switch will interrupt the cycle timer at the 8 seconds position, just before the asphalt would be sprayed, and the cycle will not continue until the bucket is full.

A switch 216 is connected to terminals 217 and 218 and is mechanically connected to a float 219 in the weigh or measuring tank or bucket 55. The switch 216 is closed by the float 219 when all of the asphalt down to the bottom of the suction pipe 54 has been pumped from the bucket. It will interrupt the cycle timer at the 11 seconds position, before the spray pump valve is closed, if the asphalt has not all been pumped out and the cycle will not continue until the bucket is empty.

A switch 220 is connected to terminals 221 and 222 and is mechanically connected to the ram or piston 148 which operates the transfer valve 57. The switch 220 will stop the cycle timer at the 0.5 second position if for any reason the valve 57 failed to open at the 16 seconds position of the preceding cycle and is not filling the weigh bucket with asphalt unless the switch 213 indicates it is full.

A switch 223 is arranged to selectively connect a terminal 224 to terminals 225 and 226. The switch 223 is mechanically connected to the ram or piston 140 which operates the spray pump valve 53. This switch will interrupt the cycle at the 15.5 seconds position of the cycle timer if for any reason the spray pump valve did not close at the 15 seconds position.

A switch 227 is connected to terminals 228 and 229 and is mechanically connected to the pug mill gates 62, 63 to be closed when the pug mill gates are closed. This switch will stop the cycle timer at the beginning of the cycle (0.0 to 0.5 second) if the pug mill gates are not completely closed at that time.

A switch 230 is connected to terminals 231 and 232 and is mechanically connected to the pug mill gates 62, 63 to be closed when the pug mill gates are in their open positions. The switch 230 will interrupt the cycle at the 19 seconds position of the cycle timer if the gates 62, 63 should not open completely. This is to insure that the pug mill has opened fully and therefore completely discharged the pug mill before the gate will close and the next cycle begins.

A switch 233 is connected to terminals 234 and 235 and is mechanically connected to the pug mill gates 62, 63 to be actuated when the gates are open. As will be described, the switch 233 is interlocked through a relay with the spray pump valve closed switch 223, and is used to actuate a batch counter each time the pug mill is opened, provided that the spray pump valve has been actuated previously in the cycle. The interlock insures that only batches actually sprayed with asphalt will be counted.

Under certain operating conditions it is desirable to increase the dry or wet mixing times beyond that set by the timer 170. For this reason, an adjustable dry mix timer 236 and an adjustable wet mix timer 237 are provided as illustrated diagrammatically in block form in Figure 2. The dry mix timer 236 is energized at the 0.5 second position of the timer cam shaft 187 and if the time set on the dry mix timer 236 has not run out by the time the timer reaches the 9 seconds position (before the asphalt is sprayed), it will interrupt the cycle timer until the pre-set time has run out. The wet mix timer 237 is energized at the 9.5 seconds position of the cycle timer and if the time set on the wet mix timer has not run out at the 18.5 seconds position (before the pug mill is discharged), the cycle will be interrupted until the time set on the wet mix timer 237 has run out.

Figure 2 illustrates the manner of interconnection of the cycle timer with the wet and dry mix timers and various switches to accomplish the functions described above. As shown, the timer motor 188 has one terminal 238 connected to a circuit point 239 which is connected through a fuse 240 and the on-off switch 165 to the terminal 166. The other terminal 241 of the timer motor 188 is connected through a conductor 242 to the terminals 211, 214, 217, 221, 226 and 231, and also through a conductor 243 to one terminal of a switch operated by the 16th cam 186. The other terminal of the switch operated by the 16th cam 186 is connected through a conductor 244 to the terminal 208 connected to one terminal of the weigh hopper full switch assembly. The other terminal of the weigh hopper full switch assembly, terminal 209, is connected through a conductor 245 to the terminal 228 connected to the pug mill gate closed switch 227. The other terminal of the pug mill gate closed switch terminal 229 is connected through a conductor 246 to a stationary contact 247 engageable by a moving relay contact 248 arranged to be operated by energization of a relay coil 249. The movable contact 248 is connected through a push-button switch 250 to a conductor 251 which is connected to a terminal 252 on the wet mix timer 237. Other terminals 253 and 254 of the wet mix timer 237 are connected together and through a conductor 255 to one terminal of a switch operated by the 13th cam 183. Another terminal of the switch operated by the 13th cam 183 is connected to a bus 256 which is connected through a conductor 257 to a circuit point 258 connected through a fuse 259 to the terminal 167.

In normal operation, when the cycle timer reaches the 20 seconds, or 0.0 second, position thereof, the timer motor 188 will be deenergized but the various switches and contacts in the circuit just described will be in positions such that actuation of the push-button 250 will energize the timer motor 188. In particular, the switch operated by the 16th cam 186 will be closed, the relay contact 248 will be engaged with the contact 247, the terminal 252 of the wet mix timer will be connected within the timer to the terminal 254 and the switch operated by the 13th cam 183 will be in a position such that the conductor 255 is connected to the bus 256.

Actuation of the push-button 250 will not cause energization of the timer motor 188 at the 0.0 second position, however, if the weigh hopper full switches 204–207 are not all closed, if the pug mill gate closed switch 227 is not closed, or if the relay coil 249 has not been energized. One terminal of the relay coil 249 is connected to the circuit point 239 and the other terminal thereof is connected through a conductor 260 to the terminal 202 of the mineral filler overflow switch 201, the other terminal 203 of the mineral filler overflow switch 201 being connected to a conductor 261 to the bus 256. Thus, closing the mineral filler overflow switch 201 will cause energization of the relay coil 249. The operation will be satisfactory if the mineral filler overflow switch 201 is actuated at any time when the supply bin gates were open, between the 10.5 and 16.5 seconds positions of the cycle timer, and a holding contact 262 is provided for maintaining energization of the coil 249 if the mineral filler overflow switch 201 is actuated at any time during the period when the supply bin gates are open. The holding contact 262 is connected to a conductor 263 which is connected to a terminal of the switch operated by the 14th cam 184, another terminal of the switch being connected to the bus 256. The sam 184 operates the switch in such a manner that the conductor 263 is connected to the bus 256 at all times except between the 2.5 seconds and 10.5 seconds positions of the timer.

In addition to being automatically stopped at the 20 seconds position, the cycle timer is also stopped at the 18.5 seconds position, just before the pug mill is discharged, so that the push-button switch 250 must be actuated to discharge the pug mill. Since the weigh hopper full switches 204–207 would not need to be closed at this point, the terminals 208 and 209 are connected to a switch operated by the 15th cam 185 between the 18 seconds and 19.5 seconds positions of the cycle timer.

In the event that continuous operation is desired, a switch 264 may be closed to short out the push-button switch 250.

At the 0.5 second position of the timer cam shaft 187, the 8th cam 178 operates a switch to connect the bus 256 to a conductor 265 which is connected to the terminal 222 of the asphalt tank filling switch 220, the other terminal 221 of such switch being connected to the terminal 241 of the motor 188. Accordingly, if the asphalt tank filling switch is closed, as it should be at this point, energization of the motor 188 will be maintained. If the asphalt tank filling switch 220 has not been closed, the motor 188 will be deenergized at the 0.5 second position of the timer, by opening of the switch actuated by the 16th cam 186, even if the push-button 250 is still actuated, or even if the switch 264 is closed. Accordingly, if the asphalt tank filling switch is open, the timer will be stopped at the 0.5 second position thereof, unless tank is full.

At the 8 seconds position of the timer, the switch operated by the 8th cam 178 will be opened, but the switch operated by the 9th cam 179 will be closed to connect the bus 256 to a conductor 266, connected to the terminal 215 of the asphalt tank full switch 213, the other terminal 214 of such switch being connected to the conductor 242 which is connected to the terminal 241 of the motor 188. Thus, energization of the timer motor 188 will be maintained if the asphalt tank full switch is closed, but if the asphalt tank full switch 213 has not been closed, the motor 188 will be deenergized and will not be reenergized until the float 194 is elevated to a tank full position to close the switch 213.

At the 9 seconds position of the cycle timer, the switch operated by the 9th cam 179 will be opened, but the switch operated by the 10th cam 180 will be closed to connect a conductor 267 to a conductor 268. The conductor 267 is connected to the terminal 212 of the weigh hopper gate closed switch 210 and the conductor 263 is connected to a terminal 269 of the dry mix timer 236. The terminal 269 may be connected within the timer 236 to a terminal 270 which is connected through a conductor 271 to the circuit point 258. Thus if the weigh hopper gates are closed and if the terminals 269 and 270 of the dry mix timer 236 are connected together, energization of the motor 188 will be maintained.

The dry mix timer has a terminal 272 connected to the circuit point 239 and another terminal 273 connected through a conductor 274 to one terminal of a switch operated by the 6th cam 176, the other terminal of such switch being connected to the bus 256. The switch operated by the 6th cam 176 is closed between the 0.5 and 1 second positions of the timer to initiate operation of the dry mix timer 236 which functions to disconnect the terminals 269 and 270 until the expiration of an adjustably pre-set time period. Thus if the time set on the dry mix timer has not run out at the 8.5 seconds position of the cycle timer, the timer motor 188 will be deenergized and will not be reenergized until the expiration of the time set on the dry mix timer 236.

At the 11 seconds position of the timer, the switch operated by the 10th cam 180 will be opened, but the switch operated by the 11th cam 181 will be closed to connect the bus 256 to a conductor 275, which is connected to the terminal 218 and hence through the batch sprayed switch 216 to the terminal 241 of the motor 188. Accordingly, the energization of the motor 188 will be maintained if the lower float 219 is lowered to a position to close the switch 216 to indicate that the batch has been sprayed, but if the batch has not been sprayed, the timer will be deenergized until spraying of the batch is completed.

At the 15.5 seconds position of the timer, the switch operated by the 11th cam 181 will be opened, but the switch operated by the 12th cam 182 will be closed to connect the bus 256 to a conductor 276 which is connected to the terminal 224 of the spray pump valve closed switch 223. If the valve 53 is closed, as it should be at this point, the terminal 224 will be connected to the terminal 226 which is connected to the terminal 241 of the timer motor 188. In case the piston or ram 140 fails to operate to close the valve 53, the terminal 224 will not be connected to the terminal 226 and the cycle timer will be deenergized at the 15.5 seconds position of the cycle timer.

The terminal 225 of the spray pump valve closed switch 223 is connected to the terminal 224 when the valve 53 is opened by the piston or ram 140. The terminal 225 is connected through a conductor 277 through one terminal of a relay coil 278, the other terminal of which is connected through the circuit point 239. Thus the relay coil 278 will be energized if the spray pump valve 53 is open during the time that the 12th cam 182 is operative to close the switch associated therewith, such switch being closed between the 14.5 and 18.5 seconds positions of the cycle timer. The conductor 277 is also connected through a holding contact 279 to the conductor 263 so that if the spray pump valve 53 is opened during the proper time interval, the relay coil 278 will remain energized until the switch operated by the 14th cam 184 is opened at the 2.5 seconds position of the timer cam shaft 187. The relay coil 278 operates a second contact 280 which connects the conductor 263 to a conductor 281 connected to the terminal 235 of the counter switch 233 at the pug mill gate, the other terminal of the counter switch being connected to one terminal 282 of a counter 283 having a second terminal 284 connected to the circuit point 239.

With this arrangement, the counter 283 will be actuated when the pug mill gate is closed, provided that the spray pump valve 53 has been opened in the previous cycle.

At the 18.5 seconds position of the cycle timer, the switch operated by the 12th cam 182 will be opened, but the switch operated by the 15th cam 185 will be closed so that even if the weigh hopper full switches 204—207 are not closed, the push-button switch 250 may be actuated to energize the timer motor 188, provided that the mineral filler overflow switch has been actuated, and provided further that the terminals 252 and 254 of the wet mix timer are connected together. The wet mix timer has a terminal 285 connected to the circuit point 239 and another terminal 286 connected through a conductor 287 to a switch operated by the 7th cam 177, the other terminal of such switch being connected to the bus 256. The switch operated by the 7th cam 177 is closed between the 9.5 and 10 seconds positions of the cycle timer to cause energization of the wet mix timer and to disconnect the terminal 252 from the terminal 254 until the expiration of an adjustable pre-set time interval.

With this arrangement, if the time set on the wet mix timer has not expired when the cycle timer reaches the 18.5 seconds position thereof, the cycle timer cannot be reenergized until the time set by the wet mix timer 237 has expired.

In addition to the circuits above described, switches not shown are preferably provided to be operated by telltales in the supply bins and operate lights at an operator's platform, to inform the operator when he is running short or about to overflow in any given supply bin. Lights may also be provided to indicate operation of the cycle timer and the wet and dry mix timers.

This invention thus provides a system in which a batch of paving material is produced with maximum speed and with accurate proportioning of the materials, and yet the system requires a minimum degree of skill for manual operation and is particularly advantageous for automatic operation.

It will be appreciated that although a particular system has been described with great detail to enable those skilled in the art to practice the invention, modifications and variations may be effected without departing from the spirit and scope of the novel concepts of the invention.

I claim as my invention:

1. In a bituminous batch plant or the like, a plurality of supply bins for different sizes of aggregates, a weigh hopper including a compartment of adjustable volume positioned below each of said supply bins, a gate between each supply bin and the weigh hopper compartment therebelow, a fluid operated actuator for each gate, each compartment having a movable side wall adjustable to vary the volume thereof, means selectively operable for adjustably moving said side walls, a plurality of control valves arranged to be coupled to a source of fluid under pressure and controlling the supply of fluid under pressure to said actuators, a conduit arranged to be connected to a source of fluid under pressure, and a selector valve for each actuator arranged to selectively connect each actuator either to one of said control valves or to said conduit, whereby said gates are selectively operable for filling each compartment during adjustment of the volume of each compartment and simultaneously operable after the volumes of all compartments have been set.

2. In a bituminous batch plant or the like, a weigh hopper compartment having an adjustable volume, a supply chute for supplying aggregate to said weigh hopper compartment, a discharge chute for receiving aggregate overflowing from said compartment, control means arranged to be actuated in response to flow through said discharge chute, and means for preventing discharge of aggregate from said compartment before actuation of said control means.

3. In a bituminous batch plant or the like, a plurality of weigh hopper compartments each having an adjustable volume, means for supplying aggregate of different sizes to said weigh hopper compartments until all compartments are full, a pug mill, gate means arranged to be operated to simultaneously discharge the aggregate from said weigh hopper compartments to said pug mill, control means responsive to closure of said gate means and arranged to prevent supply of aggregate to said weigh hopper compartments until after said gate means are closed.

4. In a bituminous batch plant or the like, a pug mill, means for supplying aggregate of various sizes to said pug mill, a bitumen measuring tank, means for supplying bitumen to said tank until said tank is full, means for transferring bitumen from said measuring tank to said pug mill, means for discharging a mixed batch of aggregate and bitumen from said pug mill, and means for preventing operation of said discharging means until said measuring tank is emptied to a certain extent.

5. In a bituminous batch plant or the like, a pug mill, means for supplying aggregate of various sizes to said pug mill, means for supplying bitumen to said pug mill, gate means arranged to be opened to discharge a mixed batch of aggregate and bitumen from said pug mill, a cycle timer operable at a certain speed for sequential operation of said aggregate supply means, said bitumen supply means and said gate means, and an adjustable timer operated in timed relation to the operation of said aggregate supply means and arranged to interrupt operation of said cycle timer and prevent operation of said bitumen supply means until after a pre-set time interval.

6. In a bituminous batch plant or the like, a pug mill, means for supplying aggregate of various sizes to said pug mill, means for supplying bitumen to said pug mill, gate means arranged to be opened to discharge a mixed batch of aggregate and bitumen from said pug mill, a cycle timer operable at a certain speed for sequential operation of said aggregate supply means, said bitumen supply means and said gate means, a first adjustable timer operated in timed relation to the operation of said aggregate supply means and arranged to interrupt operation of said cycle timer and prevent operation of said bitumen supply means until after a pre-set time interval, and a second adjustable timer operated in timed relation to the operation of said bitumen supply means and arranged to interrupt operation of said cycle timer and prevent operation of said gate means until after a pre-set time interval.

7. In a bituminous batch plant or the like, a pug mill, means for supplying aggregate to said pug mill, means for supplying bitumen to said pug mill, gate means for discharging mixed bitumen and aggregate from said pug mill, actuators for said means for supplying aggregate to said pug mill, said means for supplying bitumen to said pug mill and said gate means, at least one of said actuators being arranged to be operated either manually or automatically, a cycle timer arranged for the sequential operation of said aggregate supply means, said bitumen supply means and said gate means, and means controlled by said cycle timer for preventing manual operation of said one of said actuators except at the proper point of the cycle.

8. In a bituminous batch plant or the like, a pug mill, means for supplying aggregate to said pug mill, means for supplying bitumen to said pug mill, gate means for discharging mixed bitumen and aggregate from said pug mill, actuators for said means for supplying aggregate to said pug mill, said means for supplying bitumen to said pug mill and said gate means, each of said actuators being arranged to be operated either manually or automatically, a cycle timer arranged for the sequential operation of said aggregate supply means, said bitumen supply means and said gate means, and means controlled by said cycle timer for preventing manual operation of each of said actuators except at the proper points of the cycle.

9. In a bituminous batch plant or the like, a pug mill, means for supplying aggregate to said pug mill, means for supplying bitumen to said pug mill, gate means for discharging mixed bitumen and aggregate from said pug mill, actuators for said means for supplying aggregate to said pug mill, said means for supplying bitumen to said pug mill and said gate means, at least one of said actuators being fluid operated, control valve means for controlling supply of fluid to said one of said actuators and arranged to be operated either automatically or manually, a locking valve between said control valve and said one of said actuators, a cycle timer arranged for sequential operation of said aggregate supply means, said bitumen supply means and said gate means, and means for controlling said locking valve from said cycle timer to prevent operation of the actuator associated therewith except at the proper point of the cycle of operation.

10. In a bituminous batch plant or the like, a plurality of weigh hopper compartments each having an adjustable volume, means for supplying aggregate of different sizes to said weigh hopper compartments until all compartments are full, a pug mill, means for simultaneously discharging the aggregate from all of said weigh hopper compartments into said pug mill, means for simultaneously discharging the aggregate from all of said weigh hopper compartments into said pug mill, means including a cycle timer for automatically operating said aggregate supply means and said weigh hopper discharge means in sequence, and means for interrupting operation of said cycle timer to prevent discharge of aggregate from said weigh hopper compartments until all compartments are full.

11. In a bituminous batch plant or the like, a weigh hopper compartment having an adjustable volume, a supply chute for supplying aggregate to said weigh hopper compartment, a discharge chute for receiving aggregate overflowing from said compartment, means for discharging aggregate from said compartment, means including a cycle timer for automatically operating said discharging means, control means arranged to be actuated in response to flow through said discharge chute, and means connecting said control means and said cycle timer for preventing discharge of aggregate from said compartment before actuation of said control means.

12. In a bituminous batch plant or the like, a pug mill, means for supplying aggregate of various sizes to said pug mill, a bitumen measuring tank, means for supplying bitumen to said tank until said tank is full, means for transferring bitumen from said measuring tank to said pug mill, means including a cycle timer for operating said aggregate supplying means, said bitumen supplying means and said bitumen transferring means, and means for interrupting the operation of said cycle timer for preventing transfer from said measuring tank to said pug mill until after said measuring tank is full.

13. In a bituminous batch plant or the like, a pug mill, means for supplying aggregate of various sizes to said pug mill, a bitumen measuring tank, means for supplying bitumen to said tank until said tank is full, means for transferring bitumen from said tank to said pug mill, means including a cycle timer for operating said aggregate supplying means, said bitumen supplying means and said transferring means, and means for interrupting operation of said cycle timer for preventing operation of said transfer means in the event of failure of operation of said supply means.

14. In a bituminous batch plant or the like, a pug mill, means for supplying aggregate of various sizes to said pug mill, means for supplying bitumen to said pug mill, gate means arranged to be opened to discharge a mixed batch of aggregate and bitumen from said pug mill, means including a cycle timer for operating said aggregate supplying means, said bitumen supplying means and said gate means in sequence, and means for interrupting operation of said cycle timer for preventing closure of said gate means until after said gate means have been fully opened.

15. In a bituminous batch plant or the like, a pug mill, means for supplying aggregate of various sizes to said pug mill, means for supplying bitumen to said pug mill, gate means arranged to be opened to discharge a mixed batch of aggregate and bitumen from said pug mill, means including a cycle timer for operating said aggregate supplying means, said bitumen supplying means and said gate means in sequence, means for interrupting operation of said cycle timer for preventing closure of said gate means until after said gate means have been fully opened, and means for interrupting operation of said cycle timer for preventing operation of said aggregate and bitumen supply means until after closure of said gate means.

References Cited in the file of this patent

UNITED STATES PATENTS

| | | |
|---|---|---|
| 808,599 | Crichfield | Dec. 26, 1905 |
| 1,445,594 | James | Feb. 13, 1923 |
| 1,487,468 | Palmer et al. | Mar. 18, 1924 |
| 2,634,887 | Haegar | Apr. 14, 1953 |
| 2,714,472 | Richardson | Aug. 2, 1955 |
| 2,727,669 | Sackett | Dec. 20, 1955 |
| 2,727,733 | Carswell | Dec. 20, 1955 |

FOREIGN PATENTS

| | | |
|---|---|---|
| 218,794 | Great Britain | July 17, 1924 |